UNITED STATES PATENT OFFICE.

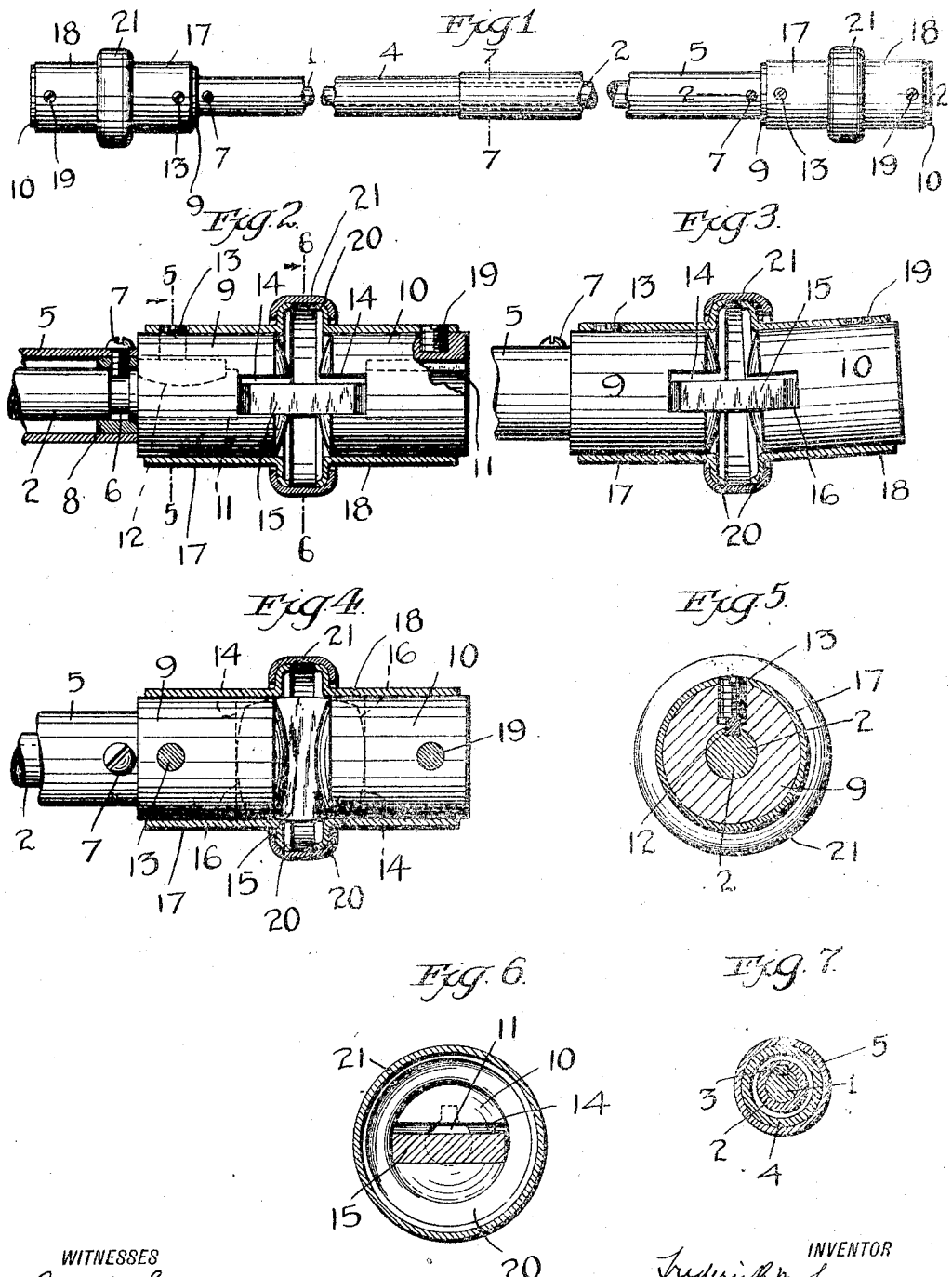

FREDERICK W. SAUER, OF HOLLIS COURT, NEW YORK.

UNIVERSAL JOINT AND FLEXIBLE DRIVING CONNECTION.

1,182,588.  Specification of Letters Patent.  Patented May 9, 1916.

Application filed April 20, 1915. Serial No. 22,546.

*To all whom it may concern:*

Be it known that I, FREDERICK W. SAUER, a citizen of the United States, residing at Hollis Court, in the county of Queens and State of New York, have invented new and useful Improvements in Universal Joints and Flexible Driving Connections, of which the following is a specification.

The object of the invention is to provide an improved universal joint and flexible driving connection, which is strong and effective for its purposes and cheap to manufacture.

The preferred embodiment of the invention will now be briefly described, without specific reference to equivalent constructions which will suggest themselves to those skilled in the art, and the novel features will be more particularly pointed out in the appended claims.

In the accompanying drawing: Figure 1 is a fragmentary side view of the entire flexible connection, with intermediate portions broken away to reduce the length for purposes of illustration; Fig. 2 is a longitudinal enlarged section on the line 2—2 of Fig. 1, with a portion broken away and interior parts shown in elevation; Fig. 3 is a view similar to Fig. 2, showing the joint flexed; Fig. 4 is a view similar to Fig. 2, the plane of the section being at right angles to the plane of that view; Fig. 5 is a cross-section on the line 5—5 of Fig. 2; Fig. 6 is a cross-section on the line 6—6 of Fig. 2; and Fig. 7 is a cross-section on the line 7—7 of Fig. 1.

The numerals 1 and 2 designate telescopic shaft members, connected as to rotation by a spline 3, and constituting a shaft section which may be lengthened or shortened. It is inclosed by a casing consisting of telescopic members 4 and 5, the outer ends of which are connected to the outer ends of the shaft sections 1 and 2 with respect to telescopic movement but free as to rotation. In this way, though the casing may be revolved with the telescopic shaft members as the result of friction, it is readily held stationary, thus removing any danger from exposure of attendants or workmen to revolving shafting. This is accomplished by forming the outer portions of the shaft members with circumferential grooves 6, in which screws 7 threaded through the walls of the casing sections are received loosely. As indicated in Fig. 2, spacing collars 8 may be interposed between the ends of the shaft and casing members.

At the opposite ends of the telescopic shaft section are universal joints, which are or may be of identical construction and only one of which, therefore, need be described in detail. Each of said joints comprises a pair of members 9 and 10, preferably in the form of cylinders, the outer ends of which are formed with sockets 11 to receive driving connections. The ends of the shaft sections 1 and 2 carrying keys 12 enter the sockets of the cylinders 9, to which they may be clamped by set screws 13. The sockets of the outer cylinders 10, it will be understood, receive the elements of the transmission line betweeen which the flexible and extensible connection represented by Fig. 1 is interposed.

The opposed ends of the cylinders are formed with recesses or cuts, in the form of diametrical slots 14, and in these slots is placed loosely a flat driving element or plate 15, thinner than the slots and having rounded ends 16, so that the form of the recesses and intermediate element permit limited angular movement of the cylinders in all directions, at the same time insuring adequate strength for driving purposes.

The cylinders are united against separation by a flexibly jointed casing which retains the otherwise loose driving element 15. As shown this casing comprises shells 17 and 18 secured by screws 13 and 19 to the cylinders and having rounded flanges 20 at their proximate ends, combined with a transversely curved annulus 21 confining said flanges. It is sufficient that the flanges be rounded at their edges and the annulus at its sides or corners, intermediate which it may be substantially cylindrical as illustrated. When the universal joint is flexed the flanges and annulus work upon each other in the manner represented in Fig. 3.

What is claimed as new is:

1. A universal joint, comprising a pair of members having recesses in their opposing ends, a driving element occupying said recesses, said element and recesses being formed to permit limited flexing movement in all directions, and a universally jointed casing uniting said members and inclosing and retaining said driving element.

2. A universal joint, comprising a pair of cylinders having registering slots in their opposed ends, a plate thinner than said slots and with rounded ends placed loosely therein, shells united to said cylinders and having curved flanges, and a transversely curved annulus receiving said flanges.

3. In a universal joint, the combination of a pair of members having recesses in their opposed ends, an intermediate element loose in said recesses, said intermediate element and recesses being of such shape and proportions as to couple the said members for driving and to permit limited angular movement thereof in all directions, shells united to said members and having curved flanges, and a transversely curved annulus receiving said flanges, said shells and annulus connecting said members against separation and retaining the otherwise loose intermediate element in place.

4. A universal joint, comprising a pair of cylinders having sockets in their outer ends for the reception of driving connections and diametrical slots in their inner ends, a flat driving element loose in said slots, and a universally jointed casing uniting said cylinders and retaining said driving element.

5. A flexible driving connection, comprising, in combination, a pair of telescopic shaft members, cylinders socketed to receive the remote ends of said shaft members, said shaft members having circumferential grooves adjacent said cylinders, telescopic casing members inclosing said shaft members, internal projections on the outer ends of said casing members entering said grooves, cylinders opposite the aforesaid cylinders, each pair of cylinders having recesses in their opposed ends, driving elements occupying said recesses, and flexibly jointed casing members uniting each pair of cylinders.

Dated, April 15th, 1915.

FREDERICK W. SAUER.

Witnesses:
T. A. ANDERSON,
G. H. ENGEY.